H. W. GRIFFIN.
SIGNALING SYSTEM FOR RAILWAYS.
APPLICATION FILED SEPT. 21, 1908.

1,000,401.

Patented Aug. 15, 1911.
3 SHEETS—SHEET 1.

Witnesses:
M. Kirtland
H. Greiff

Inventor:
Henry W. Griffin
By Geo. E. Cruse
his Attorney.

H. W. GRIFFIN.
SIGNALING SYSTEM FOR RAILWAYS.
APPLICATION FILED SEPT. 21, 1908.
1,000,401.
Patented Aug. 15, 1911.
3 SHEETS—SHEET 2.
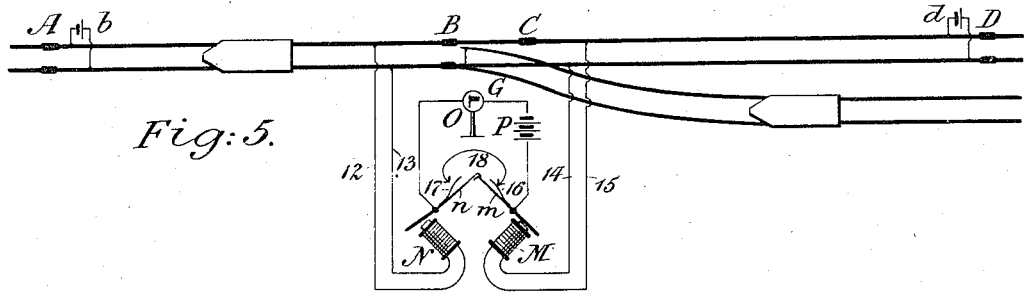
Fig: 5.
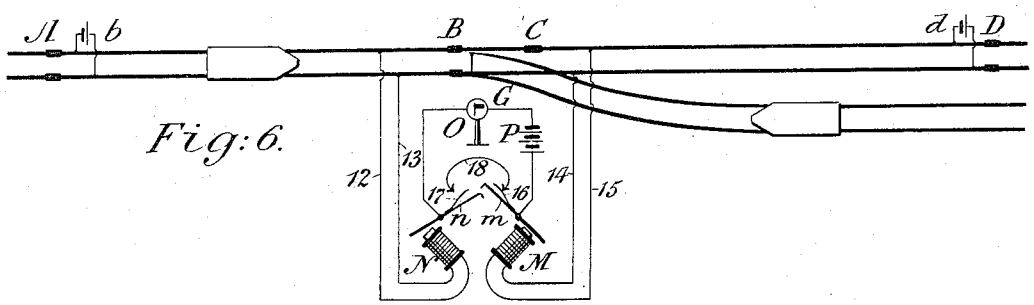
Fig: 6.
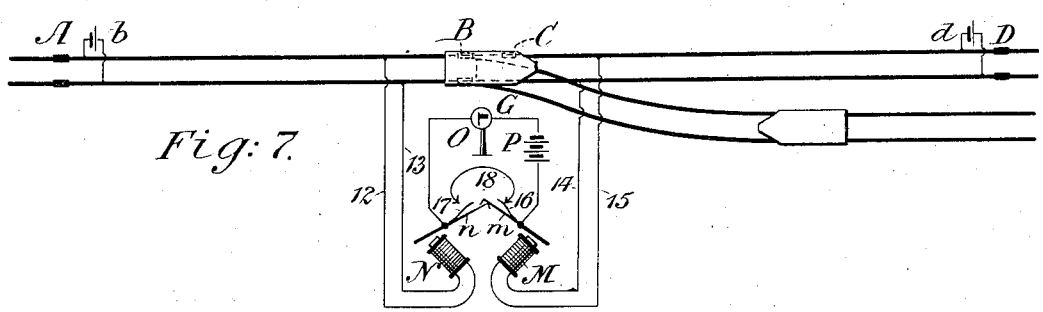
Fig: 7.
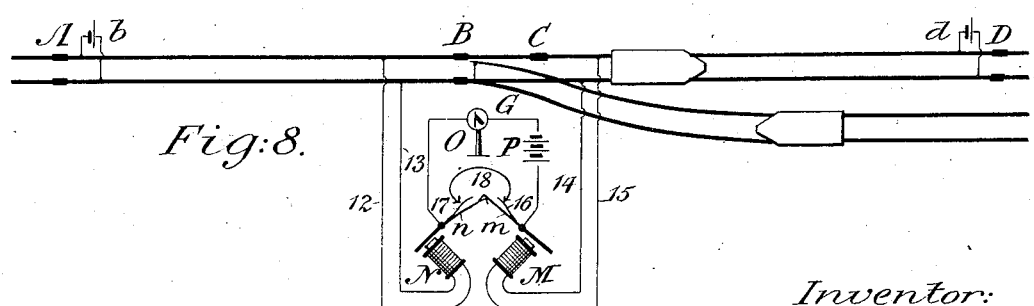
Fig: 8.
Witnesses:
Inventor:
Henry W. Griffin
By Geo. E. Cruse
his Attorney.

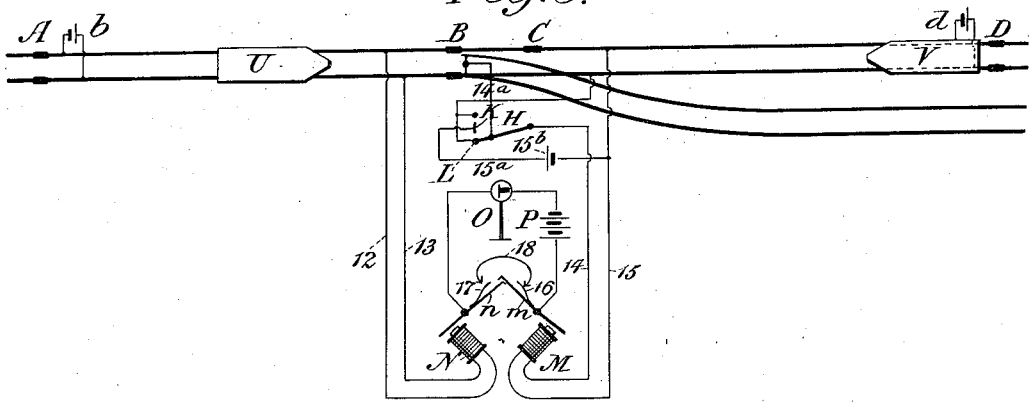
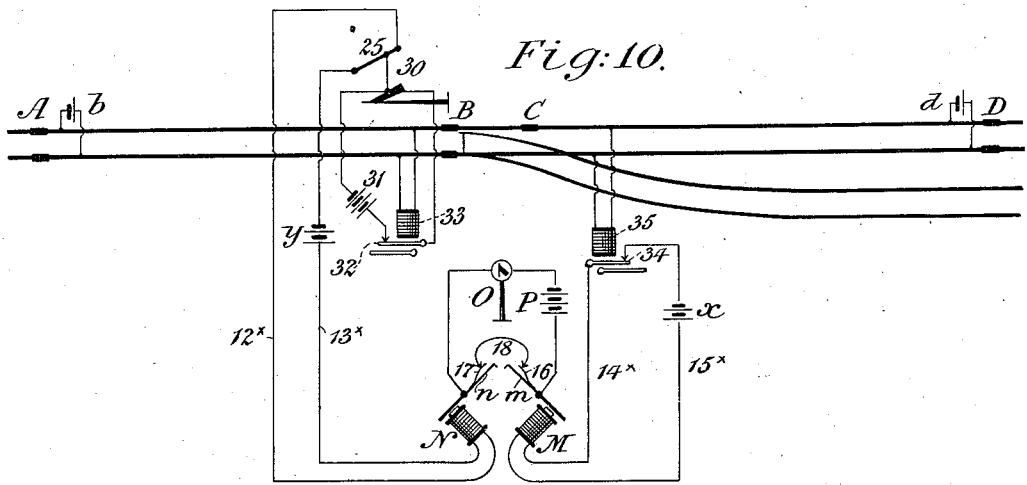

UNITED STATES PATENT OFFICE.

HENRY W. GRIFFIN, OF NEW YORK, N. Y., ASSIGNOR TO THE UNION SWITCH & SIGNAL COMPANY, OF SWISSVALE, PENNSYLVANIA, A CORPORATION OF PENNSYLVANIA.

SIGNALING SYSTEM FOR RAILWAYS.

1,000,401.  Specification of Letters Patent.  Patented Aug. 15, 1911.

Application filed September 21, 1908. Serial No. 454,066.

*To all whom it may concern:*

Be it known that I, HENRY W. GRIFFIN, a citizen of the United States, residing in the borough of Manhattan, city, county, and State of New York, have invented certain new and useful Improvements in Signaling Systems for Railways, of which the following is a specification.

My invention relates to circuits for single track switch indicators, the object of the invention being to employ a circuit, including an interlocking relay, which will operate to clear the indicator under certain conditions for one direction of traffic and set it to danger for the opposite direction.

I will describe a switch indicator circuit embodying my invention and then point out the novel features in claims.

Figure 1:
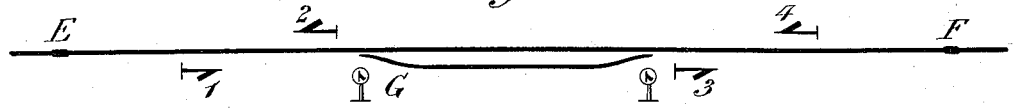

In the accompanying drawings, Figure 1 is a diagrammatic view indicating the general way in which single track switch indicators are at present controlled. Figs. 2, 3, 4, 5, 6, 7 and 8 are diagrammatic views illustrating my invention and showing various parts thereof in different positions under different track conditions. Figs. 9 and 10 are diagrammatic views illustrating modifications.

Switch indicators, as installed at present on single track roads, in connection with automatic signals, are controlled by trains on a certain amount of track circuit, the limit of this control bearing a definite relation to the signals protecting a switch, and such control being effected by trains running in either or both directions.

Referring to Fig. 1, the switch G is protected by the signals 1 and 4, and in order to prevent collisions due to a train leaving a siding via the switch G, the switch indicator is controlled beyond the signals protecting the switch, as for example at E and F. Should the switch indicator be controlled only by the track between signals 1 and 4, a train might leave the switch G under a clear indicator at the same time a train might pass either of the clear signals 1 or 4, and a collision would be rendered probable. As shown in Fig. 1, the signals 1 and 4 are clear and no train is on the track between E and F. Consequently, the switch indicator is also clear.

The switch indicator is intended to advise trainmen when the train can safely enter the main line and is not employed for a train leaving the main line for the siding. It will also be understood that the throwing of a switch from the main line position at once sets all the signals leading over or protecting the switch to danger. Under these conditions, therefore, a train bound either from E to F or from F to E would hold the indicator for the switch G at danger until the rear end of such train had entirely cleared E or F as the case might be.

In order that a switch indicator may be of value, it is, of course, necessary that it should be observed and obeyed. But frequently, in order to obey the indicator, much unnecessary delay ensues, and as all trains are required by their managements to make schedule time, the indicators are frequently disregarded.

Assuming a train to be on the siding and desirous of entering the main line by way of the switch G, and a train should enter the section at E moving toward F, the switch indicator would, of course, be set to danger and a proper observance of the indicator would require the siding train to wait until the rear of the main line train had passed F, when the indicator would go to safety. This, of course, means delay, and frequently when the rear of the main line train passes the switch G, the siding train will enter the main line against the danger signal by the switch indicator and sometimes another train may be following the first train on the main line and a collision is therefore rendered possible.

The arrangement of the signals as shown is not the standard one and in many cases, the signal 2 would not be located so that the crew of the siding train would be able to know the condition of the track between E and G.

My invention is designed to obviate the delay referred to and enable the switch indicator to give a clear signal to the siding train after the main line train has passed the switch G on its way to F provided that no other train has entered the section at E on its way to the switch G.

In Figs. 2, 3, 4, 5, 6, 7 and 8 the block signals and their connections are omitted, as the connections between the signal system and the switch would be as usual and may be readily understood.

Figure 2:
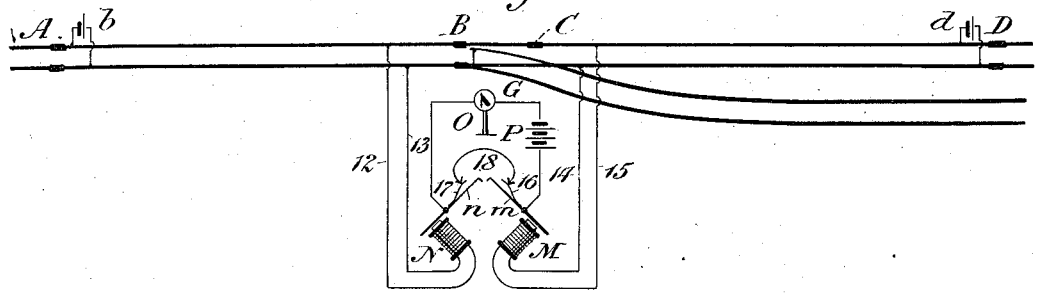

In Fig. 2 I have indicated a switch G and two insulated track sections A—B and

C—D forming part of the main line, and between these two sections, for convenience of illustrating the invention, I have shown a short section B—C, which is a "dead" section, or in other words, does not operate as a track circuit, and the switch enters the main line at this section. This dead section should be shorter than the shortest wheel base of the cars intended for use on the road. It will be understood, however, that other forms of switch insulation may be employed in which a "dead" section is not employed, in which case the track sections are A—B and B—D.

The section A—B is provided with a track battery $b$ and the section C—D is also provided with a track battery $d$, and from the rails constituting the section A—B, circuit wires 12—13 lead to one coil N of a hook or other form of interlocking relay, and from the track rails comprising the section C—D, circuit wires 14 and 15 lead to the other coil M of said interlocking relay.

The switch indicator is indicated by O and the motor for operating the indicator derives its current from a battery P and the circuit wires of the motor are connected to the hooks $n$ and $m$ respectively. It is of course understood that no current can pass directly from the hook $m$ to the hook $n$, and the hook $m$ is therefore provided with a contact 16 and the hook $n$ with a contact 17, which contacts are adapted to engage contacts on a bridge or loop 18.

As shown in Fig. 2, the parts are supposed to be in normal position with the contacts 16 and 17 both in engagement with the bridge 18 and the circuit through the indicator motor closed to move said indicator to clear position, the contacts 16 and 17 being held in engagement with the bridge on account of the coils M N being both energized by the track batteries.

Figure 3:
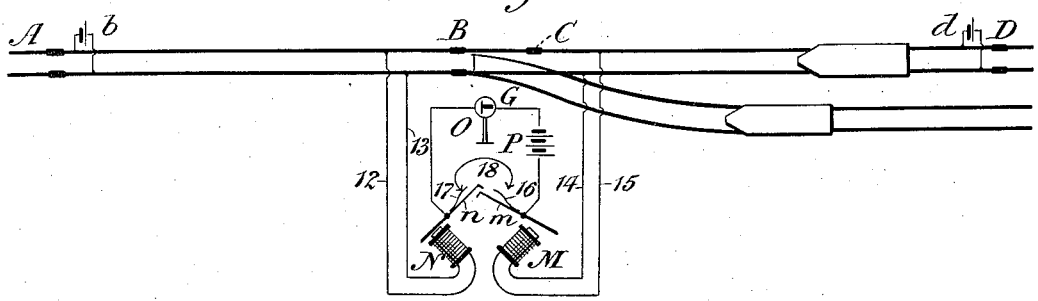
Figure 4:
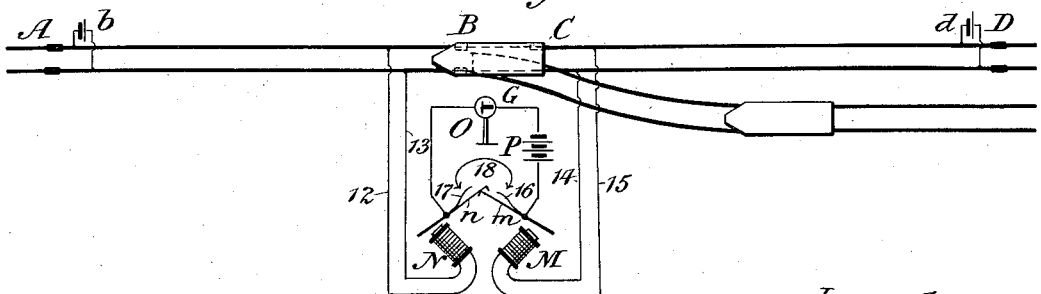

Assuming now that a train is on the siding and waiting to enter the main track through the switch G and proceed toward A and that a train is also on the section C—D proceeding toward A, as shown in Fig. 3, the coil M will be deënergized and the hook $m$ will move to disengage its contact 16 from the bridge 18 and the switch indicator will move to danger position. As the train on the main line proceeds and overlaps the dead section B—C, standing partly on section A—B and partly on section C—D, the coil N will also be deënergized and the hook $n$ will move to disengage its contact 17 from the bridge 18 as indicated in Fig. 4. As the train proceeds on the main line, and passes entirely off the section C—D, the coil M will be again energized and will move the contact 16 into engagement with the bridge 18, but the motor circuit will still be open between 17 and 18 as indicated in Fig. 5, but as soon as the main line train has passed entirely off the section A—B, the coil N will again be energized and close the circuit at 17 and 18, which will complete the circuit for the motor which operates the switch indicator and the parts will then be restored to the position indicated in Fig. 2, thus giving a clear signal to the siding train, which can then proceed on its way toward A.

Referring now to Fig. 6 and assuming that a train has entered the section A—B and is proceeding toward D with a train on the siding, the coil N will be deënergized and the indicator circuit will be broken at 17—18, and as soon as the main line train passes onto the section C—D, or in other words overlaps the dead section B—C, standing partly on section A—B and partly on section C—D, the coil M will also be deënergized but, under these conditions, the hook $m$ will be able to have only a limited movement before it will be stopped by the hook $n$ as shown in Fig. 7 and such movement will not be sufficient to break the contact at 16—18. As soon, therefore, as the train on the main line clears the section A—B, the coil N will again be energized and will move its hook $n$ and cause its contact 17 to engage the bridge 18 and the circuit through the indicator motor will thereupon be closed and the switch indicator will be moved to clear position and the siding train can at once proceed toward A without waiting until the main line train has cleared the section C—D. This is of course, assuming that another train has not entered the section A—B in the meantime, for if another train had entered the section A—B, the indicator circuit will be again broken at 17—18.

It will of course be understood that for the above actions to take place, the interlocking relay must be properly adjusted. This adjustment may be accomplished in various ways, and in the drawings I have shown it as follows: Hook $m$ is shorter than hook $n$, so that when coil M is deënergized first, and then coil N is deënergized, as indicated in Figs. 3 and 4, hook $n$ is permitted to move far enough to open its contact 17—18. When, however, coil N is deënergized first, followed by coil M, as indicated in Figs. 6 and 7, hook $m$ is prevented by the end of hook $n$ from moving far enough to open the contact 16—18. Referring now to Fig. 8, when coil N is again energized the flexibility of hook $n$ permits contact 17—18 to close, but hook $m$ is held from opening contact 16—18, even though coil M remains deënergized.

Referring now to Fig. 9, I here show a modification of the apparatus shown in Figs. 2 to 8. In this case, a circuit controller H operatively connected with the switch is included in the circuit for coil M of the interlocking relay. The circuit controller H comprises a movable contact member adapted to engage with two stationary contacts L and K whereby the wire 14 leading from magnet M may be connected either with wire 14ª leading to the track rail, or with a battery 15ᵇ and wire 15. The stationary contact L comprises two sections one of which is on each side of contact K. The circuit controller is so adjusted that when the switch G is in one extreme position or the other of its movement, the movable contact member is in engagement with contact L, but during a movement of the switch in either direction the movable member momentarily engages with contact K.

Assume that a train U enters section A—B on its way to the switch. Coil N is then deenergized and hook $n$ moves to open contacts 17—18. Assume that another train V now enters section C—D also proceeding toward the switch. Coil M will then be deenergized, but hook $m$ will be prevented by hook $n$ from moving far enough to open contact 16—18, and the parts of the relay would then be as indicated in Figs. 7 and 9. If now train U enters switch G, coil N would become energized and would close contact 17—18, and with the equipment shown in Figs. 2 to 8, the indicator would be caused to give a clear signal, the positions of the parts of the relay being as shown in Fig. 8. The train on the siding might then enter the main line while train V approaches the switch, and a collision would be rendered possible. With the equipment shown in Fig. 9, however, when the switch G is moved back to the main line position after train U has entered the siding, coil M is momentarily energized from battery 15ᵇ, closing hook $m$ and thereby freeing this hook from hook $n$. When this movement of the switch is completed, coil M is again connected directly with the track rails of section C—D, and since these rails are occupied by a train V, coil M is deënergized, hook $m$ opens and breaks the indicator circuit at 16—18, thereby causing the indicator to give a danger signal.

In Fig. 10 is shown a further modification in which the coils M and N are not directly connected to the track circuits. In this figure, the parts are in normal position when no train is on the sections A—B and C—D. In this case, the coil N derives its current from a battery through a circuit comprising wires 12ˣ and 13ˣ and a circuit controller 25 movable with a signal 30. The signal 30 is operated by current from a battery 31 and the signal circuit includes a controller 32 operated by a magnet 33 which derives current from track battery $b$. When a train is on section A—B magnet 33 will be deënergized and signal 30 will go to danger and break the circuit for coil N at the controller 25.

Coil M derives its current from a battery $x$ through a circuit including wires 14ˣ and 15ˣ and a controller 34 which is operated by a magnet 35 which derives current from track battery $d$. When a train is on the section C—D magnet 35 will be deënergized and circuit for coil M will be broken.

The coils M and N may of course be otherwise controlled as for example by the same track relays that control the block signals, or any other signals.

Other relays than the hook type may be used such as those which have their armatures drop on insulation under one condition and on a conductor under other conditions. Other types have their armatures drop on stops thus preventing contact under certain conditions.

Having thus described my invention, I claim:

1. In combination with a railway track, a switch, a switch indicator for the switch, insulated main track sections extending in each direction from the switch, an interlocking relay for controlling the movement of the switch indicator, and means controlled by the movement of a train over the insulated sections for operating the relay to clear the indicator when a train moves past it in one direction and to leave it at danger when a train moves past it in the opposite direction.

2. In combination with a railway track, a switch, a switch indicator for the switch, insulated main track sections extending in each direction from the switch, a motor for the switch indicator, an interlocking relay controlling the motor circuit, and circuits controlled by the movement of a train over said sections to operate said relay to clear the indicator when a train moves past it in one direction and to leave it at danger when a train moves past it in the opposite direction.

3. In combination with a railway track, a switch, a switch indicator for the switch, insulated main track sections extending in each direction from the switch, a motor for the indicator, an interlocking relay controlling the motor circuit, circuits connecting the interlocking relay and the insulated track sections and controlled by the movement of a train over said sections to clear the indicator when a train moves in one direction past the switch and leave it at danger when a train moves past it in the opposite direction.

4. In combination with a railway track, a switch, a switch indicator for the switch, an insulated main track section extending in each direction from the switch, an interlocking relay having two coils for controlling the movement of the indicator, and means interposed between the respective insulated sections and the respective coils and controlled by the movement of a train over both sections for operating said relay to clear the indicator when a train moves past it in one direction and to leave it at danger when a train moves past it in the opposite direction.

5. In combination with a railway switch, a switch indicator for the switch, insulated main track sections extending in each direction from the switch, an interlocking relay for the control of the switch indicator, circuits for said relay including the rails of the insulated track sections, which circuits are affected by the movement of a train over the main track for the operation of the relay.

6. In combination with a railway track, a switch leading from said track, a switch indicator for the switch, an interlocking relay for the control of the switch indicator and comprising two magnet windings, insulated sections of the said track extending in each direction from the switch, a track circuit for each of the track sections, each circuit comprising a source of current and a magnet winding of the interlocking relay.

7. In combination with a railway track, a switch leading from said track, a switch indicator for the switch, an interlocking relay for the control of the switch indicator and comprising two magnet windings, insulated sections of the said track extending in each direction from the switch, a track circuit for each of the track sections, each circuit comprising a source of current and a magnet winding of the interlocking relay, and a circuit controlled by the interlocking relay for moving the indicator to clear position when a car or train passes the switch moving in one direction and for holding the indicator in danger position when a car or train passes the switch moving in the opposite direction.

8. In combination with a railway track, a switch leading from said track, a switch indicator for the switch, an interlocking relay for the control of the switch indicator and comprising two magnet windings, insulated sections of the said track extending in each direction from the switch, a track circuit for each of the track sections, each circuit comprising a source of current and a magnet winding of the interlocking relay, an additional source of current, and a circuit controller operatively connected with the switch and adapted to disconnect one of the magnet windings from its track circuit and connect the said magnet winding with the additional source of current.

In testimony whereof I have signed my name to this specification in the presence of two subscribing witnesses.

HENRY W. GRIFFIN.

Witnesses:
  M. L. KIRTLAND,
  W. F. WOOD.